United States Patent [19]

Ogawa et al.

[11] Patent Number: 4,750,056
[45] Date of Patent: Jun. 7, 1988

[54] POWER CIRCUIT FOR A RECORDING UNIT IN AN ELECTRONIC CAMERA

[75] Inventors: Kimiaki Ogawa; Shigeo Suzuki, both of Tokyo, Japan

[73] Assignee: Asahi Kogaku Kogyo Kabushiki Kaisha, Tokyo, Japan

[21] Appl. No.: 787,591

[22] Filed: Oct. 15, 1985

[30] Foreign Application Priority Data

Oct. 25, 1984 [JP] Japan .................. 59-225045

[51] Int. Cl.[4] ........................ H04N 5/78; H04N 9/491
[52] U.S. Cl. .................... 360/35.1; 358/335; 358/906; 358/909
[58] Field of Search ............... 360/33.1, 35.1; 358/310, 311, 335, 906, 903, 225, 213.11, 909

[56] References Cited

U.S. PATENT DOCUMENTS

| | | | |
|---|---|---|---|
| 4,368,490 | 1/1983 | Takimoto | 358/906 X |
| 4,386,376 | 5/1983 | Takimoto et al. | 358/335 |
| 4,400,143 | 8/1983 | Takimoto et al. | 358/906 X |
| 4,531,164 | 7/1985 | Maeda et al. | 358/906 X |
| 4,544,959 | 10/1985 | Koyuki et al. | 358/906 X |
| 4,571,629 | 2/1986 | Horio et al. | 358/225 |
| 4,589,023 | 5/1986 | Luzuki et al. | 358/213 |
| 4,603,354 | 7/1986 | Hashimoto et al. | 358/213 |
| 4,675,747 | 6/1987 | Hanma et al. | 360/35.1 X |

Primary Examiner—Aristotelis M. Psitos
Attorney, Agent, or Firm—Sughrue, Mion, Zinn, Macpeak & Seas

[57] ABSTRACT

In an electronic still camera, an electric signal generated by photoelectric conversion of an optical image of an object is recorded on a recording medium. In consideration of a response time for steadily applying power supply to a recording circuit, power is supplied to the recording circuit only between initiation of a shutter releasing operation and completion of a recording operation, to thereby lengthen battery life when a battery is employed as the power source in the camera.

11 Claims, 2 Drawing Sheets

4,750,056

POWER CIRCUIT FOR A RECORDING UNIT IN AN ELECTRONIC CAMERA

BACKGROUND OF THE INVENTION

This invention relates to a power circuit for a recording unit in an electronic still camera.

In an electronic still camera, which is different from a camera using silver halide photographic film, the optical image of an object which is formed on an image sensor, is photoelectrically converted to be recorded on a recording medium. In case of a magnetic disc being employed as the recording medium, the photoelectrically converted signal is further subjected to an electromagnetical conversion to be recorded on the magnetic disc. Generally, this type of camera requires a power source for driving the recording circuit in order to record on the recording medium. In the conventional recording circuit, power is applied to the circuit when a main switch of a camera or a switch for measuring light is turned ON. However, the recording circuit need not be driven until a release operation is performed. Consequently, power is wasted, and when a battery is used as a power supply, battery life is low.

SUMMARY OF THE INVENTION

An object of the present invention is to provide a power circuit in which power is not wasted.

In general, power must be applied to a recording circuit between the completion of an exposure and the completion of a recording. However, in consideration of a response time for steadily applying a power supply to a recording circuit, the recording circuit of the present invention is constructed in such a manner that power is supplied between the beginning of the release operation and the completion of the recording.

BRIEF DESCRIPTION OF THE DRAWINGS

The invention will be described below with reference to the accompanying drawings, in which.

DETAILED DESCRIPTION OF THE PREFERRED EMBODIMENT

Figure 1:
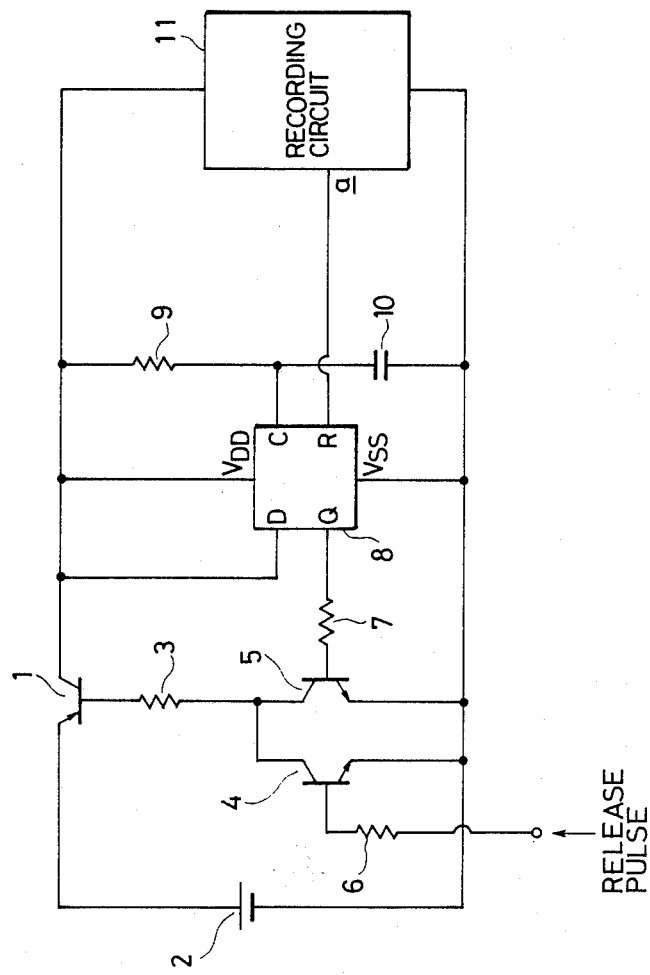
FIG. 1 is a circuit diagram showing one embodiment of the present invention.

In FIG. 1, the emitter of a transistor 1 is connected to a positive terminal of a power source 2, and the base of the transistor 1 is connected through a resistor 3 to the respective collectors of transistors 4 and 5. The base of the transistor 4 is connected to one terminal of a resistor 6, the other terminal of which receives a release pulse generated upon a initiation of a release operation. The base of the transistor 5 is connected through a resistor 7 to a terminal Q of a D-type flip-flop 8. Both of the emitters of the transistors 4 and 5 are connected to a negative terminal of the power source 2.

A positive terminal $V_{DD}$ and a negative terminal $V_{SS}$, which are power supply terminals of the flip-flop 8 are respectively connected to the collector of the transistor 1, and to the negative terminal of the power source 2. Further, terminals D and C of the flip-flop 8 are respectively connected to the collector of the transistor 1, and to one terminal of a resistor 9, the other terminal of which is connected to the collector of the transistor 1, and one terminal of a capacitor 10, the other terminal of which is connected to the negative terminal of the power source 2.

A recording completion pulse a, which a recording circuit 11 outputs after a recording is completed, is applied to the terminal R of the flip-flop 8. The positive and negative power terminals of the recording circuit 11 are respectively connected to the collector of the transistor 1 and to the negative terminal of the power source 2.

The capacitor 10 is charged through the resistor 9. Then, when the terminal C of the flip-flop 9 goes from a low level to a high level, the terminal Q is changed from a low level to high level because the terminal D is at a high level, so that the transistor 5 it turned ON. The above operation is carried out while a release pulse is applied, that is, while the transistor 4 is ON. When the release pulse vanishes, the transistor 4 is turned OFF. However, the transistor 5 is maintained turned ON, and then the transistor 1 stays ON so that power is continuously supplied to the recording circuit 11.

An exposure is performed by camera shutter release, whereby a recording is made on a recording medium after exposure. After the completion of the recording, the recording circuit 11 outputs a recording completion pulse to reset the flip-flop 8, so that the terminal Q goes once again to a low level. When the terminal Q of the flip-flop 8 takes a low level, the transistor 5 turns OFF. Consequently, the transistor 1 turns OFF, so that the power supply to the recording circuit 11 is stopped.

Figure 2:
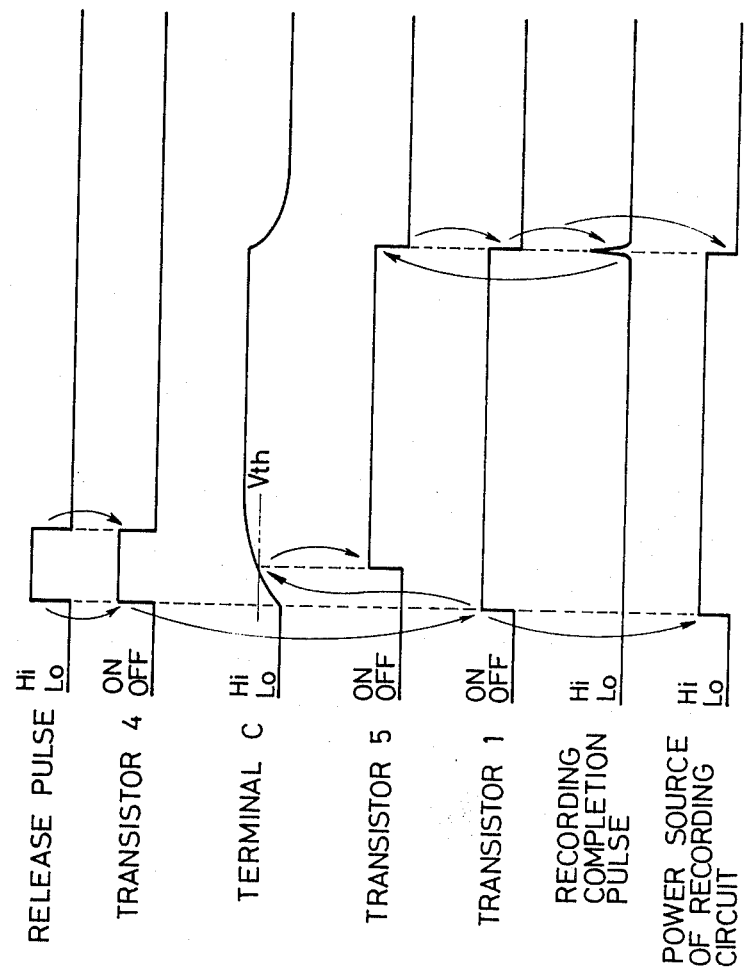
FIG. 2 is a time chart showing the timing of circuit elements of the present invention.

FIG. 2 shows that, when the release pulse has a high level, the transistor 4 is turned ON, and the transistor 1 also is turned ON so that power is supplied to the recording circuit. The level of the terminal C of the flip-flop 8 takes a high level according to the transistor 1 turning ON. Subsequently, if the level rises beyond the threshold value Vth, the transistor 5 turns to ON. As a result, the transistor 1 stays ON even if the transistor 4 is turned OFF, because the release pulse vanishes. Furthermore, power continues to be supplied to the recording circuit, as shown by the longer duration of the high level of the pulse supplied by the power source in FIG. 2.

After completion of the exposure and the recording, the recording completion pulse issues from the recording circuit 11 so that the transistor 5 also is turned OFF, and then the transistor 1 is turned OFF. As a result, the power source once again does not supply power to the recording circuit, as shown by the low level of the power source signal in FIG. 2. The recording compeltion pulse is of short duration.

As described above, power is supplied to the recording circuit only between the actuation of the shutter release and the completion of recording. Accordingly, power waste can be eliminated, lengthening battery life when a battery is employed as the power source in the camera.

What is claimed is:

1. A power circuit in an electronic still camera in which an optical image of an object to be photographed is photoelectrically converted into an electric signal to be recorded onto a recording medium comprising:
   a recording circuit;
   means for generating a release pulse;
   means for detecting said release pulse;
   a power source coupled to said recording circuit;
   a first circuit means for generating a first output signal when electric power is supplied to said recording circuit and stopping the generation of said first output signal upon reception of a recording completion signal indicating completion of the recording operation of the electric signal to said recording medium; and a second circuit means which is rendered conductive when a second output signal from said means for detecting said release pulse, indicative of an initiation of a shutter releasing operation, is generated, said second circuit means remaining conductive after completion of said second output signal for as long as said first output signal is generated, to thereby supply electric power to said recording circuit.

2. A power circuit as claimed in claim 1, wherein said second circuit means comprises a first switching means being rendered conductive in response to the generation of said first output signal, a second switching means being rendered conductive in response to the generation of said second output signal, and a third switching means being rendered conductive when at least one of said first switching means and said second switching means is rendered conductive, to thereby supply the electric power to said recording circuit.

3. A power circuit as claimed in claim 2, wherein said first circuit means comprises a D-type flip-flop having a reset terminal to which said recording completion signal is supplied and a Q terminal connected to said first switching means.

4. A power circuit as claimed in claim 3, wherein said first circuit means further comprises a delay means including a series circuit of a resistor and a capacitor, which is coupled to said power source, a junction point of said resistor and said capacitor being connected to a C terminal of said D-type flip-flop.

5. A power circuit as claimed in claim 4, wherein said resistor and said capacitor comprise resistor and capacitor intergrated circuit elements.

6. A power circuit as claimed in claim 2, wherein said first, second and third switching means comprise transistors.

7. A power circuit for a recording circuit in an electronic still camera, said camera including a recording circuit for recording an electric signal, generated by a photoelectric conversion of an optical image of an object on a recording medium, said power circuit comprising:

a power source;
means for generating a release pulse;
means for detecting said release pulse;
a third switching means connected between one terminal of said power source and one terminal of said recording circuit, a second terminal of said recording circuit being connected to a second terminal of said power source;
a second switching means, responsive to a second signal from said means for detecting a release pulse, and indicative of intitiation of a shutter releasing operation, for setting said third switching means, whereby power supply to said recording circuit is initiated;
a D-type flip-flop having a first output whose level varies in response to said third switching means and, upon completion of said recording operation, to an output of said recording circuit; and
a first switching means, responsive to said first output of said D-type flip-flop, for setting said third switching means, so that said power source remains connected to said recording circuit from reception of said second signal until said completion of a recording operation.

8. A power circuit as claimed in claim 7, further comprising a resistor having one end connected to one terminal of said third switching means and to one terminal of said recording circuit, and a capacitor having one end connected to said second terminal of said power source and to said second terminal of said recording circuit, a C terminal of said D-type flip-flop being connected to a junction point of said resistor and capacitor.

9. A power circuit as claimed in claim 8, wherein said resistor and capacitor forms an integrated circuit.

10. A power circuit as claimed in claim 7, wherein said first, second and third switching means comprise transistors.

11. A power circuit as claimed in claim 7, wherein said power source is a battery.

* * * * *